United States Patent Office 2,810,139
Patented Oct. 22, 1957

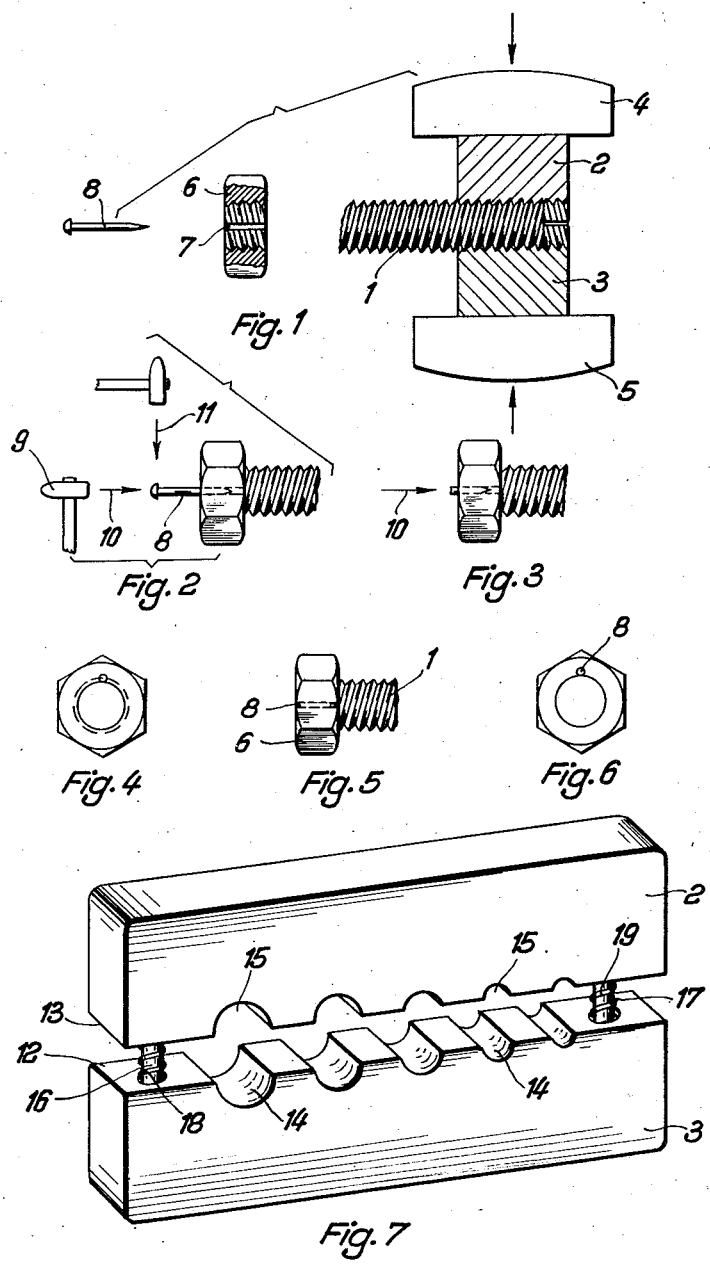

2,810,139

PROCESS OF MAKING A BOLT HEAD BY PERMANENTLY SECURING A NUT TO A THREADED ROD

Werner Plagemann, Berlin-Halensee, Germany

Application June 16, 1954, Serial No. 437,185

Claims priority, application Germany July 4, 1953

2 Claims. (Cl. 10—27)

The present invention relates to improvements in screw bolts and more particularly to a process of manufacturing headed screw bolts which will permit the screwing-on of a nut to a bolt of required length cut off from a threaded spindle and firmly securing said nut to the bolt end.

A proposal made heretofore by the present applicant consists in the threaded spindle, from which the bolt blanks are cut off, being provided with a longitudinal through slot and providing said nut also with a similar slot and bringing both slots of nut and bolt into such a position that they will be forming a continuous slot into which slot a wedge will be hammered. But securing both parts will not always result into a sufficiently firm union and, moreover, will be disadvantageous in that the threaded spindle, from which the bolt pieces have been cut off, has to be provided with a longitudinal slot; this requires at least an additional operation and will, therefore, add to the manufacturing costs. In addition, there must always be a wedge on hand to fit the depth of the slot.

An object of the invention is the provision of a still better union between nut and bolt piece without the use of special wedges and without the longitudinal slot along the outside of the bolt shank, in order to lower the manufacturing costs and to simplify the method hitherto used. This is effected by having the nut, which is provided with a longitudinal groove or through slot, screwed upon the bolt piece and the threads of said bolt piece upset by a pointed steel pin hammered into said slot while the bolt piece is being clamped in position, whereupon the part of the steel pin extending beyond said nut is sheared off by a hammer blow. In this way the steel pin, hammered into the slot of the nut and, thereby, upsetting the threads of the bolt, will cause a practically undetachable union between nut and bolt piece. This union is of such strength that upon force being applied the bolt will shear off rather than the screwed-on nut getting loose.

Another advantage consists in the steel pin being able to be hammered into the nut to almost its entire depth in any position whatsoever so that two slots need not be aligned as had to be effected heretofore. In this manner the nut can be screwed upon the bolt exactly to such a depth that the end of the bolt piece will coincide with the face of the nut, it being superfluous to have this side of the nut finished.

A suitable embodiment of the method consists in the steel pin being hammered almost through the entire depth of the nut and having it sheared off and the still protruding part of said steel pin hammered-in to be flush with said nut. In this manner it is possible to have the steel pin not protruding anywhere or being forced to have said protruding part ground off.

For the purpose of facilitating implementation of the method according to the present invention a device is provided in which each half of a two-part block is provided with semi-circular threaded recesses arranged side by side and adapted for different bolt sizes, and where each of the two block-halves is provided with one hole at each end adapted to receive a spring-loaded guide pin for bringing said two block halves together between the jaws of a vise. This device permits its use in the shop by employing shop means because practically only a vise for clamping the device is needed. An advantage of this device consists in the simple and many-sided applicability for different sizes of bolts. The automatic opening of the device makes rapid operation possible.

Still another object of the present invention is the special construction of the nut, which is provided with a longitudinal groove, for the manufacture of screw bolts according to the described method. This construction is characterized by said longitudinal groove being of greater depth than the thread, making it possible to force the point of the steel pin between the crest of the bolt threads and the bottom of the longitudinal slot. In this manner part of the steel pin protruding out of the groove serves for the deformation of the bolt thread. Due to the stressed material the pin is undetachably secured between the parts intended to be fastened together.

Still another object of the present invention will be seen in the provision of a conventional pointed and hardened steel pin the shank diameter of which is somewhat larger than the width of the longitudinal groove.

The above objects and advantages of the invention will be more readily apparent from the following description when read in conjunction with the accompanying drawings in which:

Fig. 1 shows the clamped shank of a bolt piece and a nut, both partly in section, and a steel pin;

Fig. 2 shows in elevation the screwed-on nut with the steel pin partly hammered-in, and a hammer;

Fig. 3 shows in elevation the screwed-on nut with the inserted steel pin hammered off;

Fig. 4 is a plan view of the nut without steel pin screwed upon the bolt shank;

Fig. 5 is an elevation of the nut with the steel pin hammered-in flush with the face of the nut;

Fig. 6 is a plan view of Fig. 5; and

Fig. 7 is a prespective view of the clamping device.

A bolt shank 1 is cut from a screw spindle of some length and clamped between the blocks 2 and 3 as shown in Fig. 7 which blocks in their turn are clamped between the jaws 4 and 5 of a vise not shown. A nut 6 is screwed onto said bolt shank and is provided with a longitudinal groove 7 extending from one end face of the nut to the other. The groove has about a semi-circular cross section the depth of which is a little greater than the depth of both the internal thread of the nut and the external thread of the bolt or rod 1 as shown in Fig. 4, making it possible to hammer the point of a steel pin 8 between the crest of the bolt threads and the semi-circular bottom of the longitudinal slot. It is advisable to have said semi-circular bottom adapted to the cross-sectional shape of the bolt shank; this, however, is not a necessary prerequisite. The longitudinal groove may also have a square cross section. Under all circumstances, the general diameter of the shank of the pin should be slightly greater than the width of the groove, so that not only the apexes of the bolt threads but also the ends of the nut threads bordering the groove will be extensively and permanently deformed or upset by the pin. The method of producing a headed screw according to the present invention will now be readily understood by considering Fig. 2. The steel pin 8 is hammered into the nut to a certain depth by a hammer 9 in the direction of an arrow 10. Thereupon said steel pin is severed by a hammer blow in the direction of arrow 11 and finally hammered again into the nut by several blows in the direction of arrow 10, until the driven end of the pin is flush with the outer end face of the nut as shown in Fig. 5.

Fig. 7 shows the clamping device. It consists of a two-part block having surfaces 12 and 13, respectively, each one of which is provided with five threaded semi-circular recesses 14 and 15, respectively, adapted to fit different bolt sizes. The two block halves 2 and 3 are brought together along two guide pins 16 and 17 which are provided with springs 18 and 19. The bolt shanks being inserted the two block halves 2 and 3 are pressed together in a vise as shown in Fig. 1. The threaded spindles and nuts, which may also be wing nuts, as well as the steel pins necessary for the manufacture of the different bolts can conveniently be put together with the clamping device in a box provided with compartments.

It will be understood that the invention herein disclosed is not limited to the precise steps recited in the specific example given but may be variously modified within the scope of the appended claims.

Having thus described my invention what I claim as new and desire to secure by United States Letters Patent is:

1. In the process of producing a headed screw from an elongated rod provided with external threads; the steps of forming in the inner surface of a nut having opposite end faces and internal threads in said inner surface a longitudinal groove extending from one of said end faces to the other substantially transversely to said internal threads and with a depth slightly greater than said internal threads, threading said nut onto said rod, inserting into the end of said groove adjacent one of said end faces of said nut the pointed tip of a steel pin having otherwise a diameter slightly greater than the width of said groove, impacting said pin axially to drive the same into and at least partly through said groove, whereby those portions of the apexes of said external threads of said rod contacted by said pin at said groove and the ends of said internal threads of said nut located at the lateral borders of said groove are extensively deformed to produce a permanent union between said nut and said rod, removing from the part of said pin driven into said groove at least a portion of the remainder of said pin still projecting beyond said one end face of said nut, and further impacting said part of said pin axially to drive the same completely into and through said groove until the driven end of said part of said pin is substantially flush with said one end face of said nut.

2. The process of producing a headed screw from an elongated headless rod provided with external threads, comprising the steps of defining in the inner surface of a nut provided with internal threads in said inner surface a groove extending from one of the end faces of said nut to the other substantially transversely to said internal threads and with a depth somewhat greater than said internal threads, screwing said nut onto said rod until said one end face of said nut is substantially flush with one of the end faces of said rod, inserting into the end of said groove adjacent said one end face of said nut the pointed tip of a steel pin having generally a diameter slightly greater than the width of said groove, impacting said pin axially thereof to drive the same into said groove until said pointed tip approaches said other end face of said nut, whereby those portions of the apexes of said external threads of said rod at said groove and those portions of said internal threads of said nut located at the sides of said groove are extensively deformed by said pin to bring about a permanent union between said nut and said rod, impacting said pin transversely to its axis to shear from the part of said pin driven into said groove at least a portion of the remainder of said pin still projecting from said one end face of said nut, and further impacting said part of said pin axially thereof to drive the same through said groove until said pointed tip is substantially flush with said other end face of said nut and the driven end of said pin is substantially flush with said one end face of said nut.

References Cited in the file of this patent

UNITED STATES PATENTS

| 791,374 | Shepardson | May 30, 1905 |
| 929,084 | George | July 27, 1909 |
| 1,139,479 | Brightman | May 18, 1915 |
| 2,438,989 | Billman | Apr. 6, 1948 |

FOREIGN PATENTS

| 859,705 | Germany | Dec. 15, 1952 |